United States Patent [19]
Perry et al.

[11] 3,789,079
[45] Jan. 29, 1974

[54] PROCESS FOR THE SEPARATION OF DIENE FROM ORGANIC MIXTURES

[75] Inventors: Eli Perry, St. Louis; William F. Strazik, St. Ann, both of Mo.

[73] Assignee: Monsanto Company, St. Louis, Mo.

[22] Filed: Sept. 22, 1972

[21] Appl. No.: 291,452

[52] U.S. Cl. .................. 260/681.5 R, 260/677 A
[51] Int. Cl. .............................................. G07c 7/00
[58] Field of Search .. 260/681.5, 677; 208/291, 308

[56] References Cited
UNITED STATES PATENTS

| | | | |
|---|---|---|---|
| 2,885,357 | 5/1959 | Archibald et al. | 208/291 |
| 2,947,687 | 8/1960 | Lee | 208/308 |
| 2,985,588 | 5/1961 | Binning et al. | 208/308 |
| 3,496,245 | 2/1970 | DeFeo et al. | 260/681.5 R |
| 3,370,102 | 2/1968 | Carpenter | 208/308 |

Primary Examiner—Delbert E. Gantz
Assistant Examiner—Veronica O'Keefe
Attorney, Agent, or Firm—Lynden N. Goodwin et al.

[57] ABSTRACT

Dienes are separated from organic mixtures comprising diene and alkene having one double bond by contacting the mixture against one side of a polymeric permeation membrane which is an aromatic imide polymer of the formula

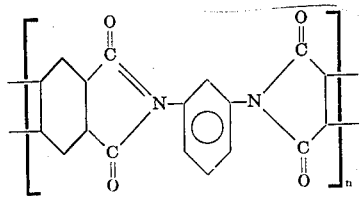

and withdrawing at the other side a vaporous mixture having increased diene concentration. Exemplary of the organic mixtures is a mixture of butadiene and butene.

4 Claims, No Drawings

3,789,079

PROCESS FOR THE SEPARATION OF DIENE FROM ORGANIC MIXTURES

BACKGROUND OF THE INVENTION

1. Field of the Invention

This invention relates to a process for separating dienes from organic mixtures containing same. In a particular aspect this invention relates to a process for the separation of diene from organic mixtures comprising diene and alkene having one double bond by preferential permeation through a membrane under pervaporation conditions. In a more particular aspect this invention relates to a process for the separation of diene from an organic mixture comprising diene and alkene having one double bond by contacting said mixture against one side of a polymeric permeation membrane which is an aromatic imide polymer of the formula

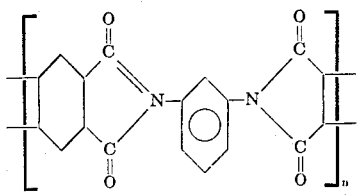

and recovering on the other side a vaporous mixture rich in diene.

2. Description of the Prior Art

Processes for the preparation of dienes such as butadiene and isoprene yield reaction mixtures which contain organic reaction products (typically substituted and unsubstituted $C_3$–$C_{12}$ hydrocarbons) in addition to organic solvents and the desired diene. Separation of dienes from such organic reaction media has been accomplished by distillation procedures. Principally because of the close boiling points of dienes and typical reaction by-products, especially the corresponding alkenes having one double bond high reflux ratios or azeotropic agents and costly distillation equipment are required for the distillation separation procedure.

Separation of components of azeotropic mixtures of organic materials by pervaporation through polymer membranes followed by distillation is know to the art from U.S. Pat. No. 2,953,502 issued Sept. 20, 1960 to R. C. Binning and Robert J. Lee.

SUMMARY OF THE INVENTION

It has been discovered in accordance with the present invention that dienes are effectively separated from organic mixtues comprising diene and alkene having one double bond by contacting the mixture against one side of a polymeric permeation membrane which is an aromatic imide polymer of the formula

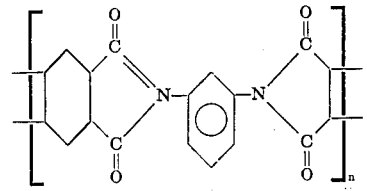

and withdrawing at the second side a vaporous mixture having a higher concentration of diene than the aforesaid mixture. Aromatic imide polymer membranes employed in the process of the present invention are highly efficient in separating diene from other components of such membranes mixtures using pervaporation separation techniques. The present invention is further advantageous in that it permits avoidance of costly distillation procedures.

DETAILED DESCRIPTION

The process of the present invention comprises contacting an organic feed mixture comprising diene and alkene having one double bond against one side of a polymeric permeation membrane which is an aromatic imide polymer and withdrawing at the second side a mixture having a higher concentration of the preferentially permeable diene than the aforesaid feed mixture. It is essential that the mixture at the second side be maintained at a lower chemical potential than that on the feed side. It is also essential that the product be withdrawn at the second side in the vapor state. In the commercial utilization of the process, multi-stage operation is feasible since this permits the operation of individual stages at various concentrations and temperatures in order to achieve the optimum driving force for the process.

For each individual stage the effectiveness of the separation is shown by the separation factor (S.F.).

The separation factor (S.F.) is defined as the ratio of the concentrations of two substances, A and B, to be separated, divided into the ratio of the concentrations of the corresponding substances in the permeate, S.F. = $(C_A/C_B)$ in permeate/$(C_A/C_b)$ in permeant where $C_A$ and $C_B$ are the concentrations of the preferentially permeable component and any other component of the mixture or of the sum of other components respectively.

In carrying out the process of the present invention, the first or feed side of the membrane is such that the activities of the components are greater than the activities on the second side. Preferably the first side is above atmospheric pressure and the second side below atmospheric pressure. Still more preferably, the second side is maintained such that the pressure differential is greater than 0.01 atmosphere or preferably from about 0.1 to about 0.5 atmosphere. A further preferred mode of operation is with the second side maintained at a vacuum of greater than 0.2 mm. Hg.

The term "Chemical Potential" is employed herein as described by Olaf A. Hougen and K. M. Watson ("Chemical Process Principles, Part II", John Wiley, New York, 1947). It is related to the escaping tendency of a substance from any particular phase. For an ideal vapor or gas, this escaping tendency is equal to the partial pressure so that it varies greatly with changes in the total pressure. For a liquid, the change in escaping tendency as a function of total pressure is small. The escaping tendency always depends upon the temperature and concentration. In the present invention, the feed substance is typically a liquid solution and the other side of the membrane is maintained such that a vapor phase exists. A vapor feed may be employed when the mixture to be separated is available in that form from an industrial process or when heat economies are to be effected in a multistage process.

The feed side may be at pressures less than atmospheric, but preferably greater than atmospheric and also at pressures over and above the vapor pressure of the liquid components. The collection or permeate vapor side of the membrane is preferably less than atmospheric pressure, but under proper feed side conditions, also may be greater than atmospheric pressure.

The total pressure on the feed side is preferably between 0 psi absolute and 5,000 psig.

The conditions are always such as to maintain a higher potential on the feed side than on the collection or vapor side.

The temperatures on the feed side and the collection side may vary over a wide range. However, temperatures should be avoided which cause substantial decomposition of any of the organic materials in the mixture or of the membrane and which cause the vapor pressure on the collection side of any of the permeated materials to be exceeded by the pressure being maintained on that side. Typically, an increase in temperature causes an increase in permeation rate. A dramatic increase in rate often occurs when the temperature exceeds the glass transition temperature of the polymer membrane being used in the separation precedure.

The process of the present invention provides for the separation of diene from organic mixtures comprising diene and alkene having one double bond. Such dienes are substituted and unsubstituted and typically contain from 4 to 8 carbon atoms. A diene may be substituted with, for example alkyl, aromatic and halogen substituents. Typical organic compounds and mixtures from which the dienes are separated include $C_3$–$C_{12}$ alkenes such as butene, hexene, propylene, and heptene as well as other hydrocarbons such as chlorohexane, acrylic acid, octane, propane, etc. and the like. Separations are carried out by removal of the preferentially permeable diene through the membrane with the said diene, in a higher concentration than in the feed, being recovered from the collection side of the membrane as a vapor and with the imposition of a state of lower chemical potential on such collection side of the membrane. For example, a mixture of butadiene and butene may be applied to one side of a flat diaphram or membrane to accomplish removal of at least a part of the butadiene, leaving a more highly concentrated butene solution at the feed side of the membrane or diaphram. A state of lower chemical potential is maintained on the collection or downstream side of the membrane by vacuum e.g. from 0.1 mm to the vapor pressure of the organic component of the mixture which has the lowest vapor pressure at the membrane at the respective temperature as long as the vapor phase is present on the downstream side.

In the system referred to above, the butadiene selectively passes through the membrane with the butadiene-rich composition being rapidly removed as vapor from the collection side of the membrane.

In contrast to the present invention, the employment of permeates in liquid phase on the second side of the membrane is impractical because the applied pressure has been found to be prohibitively high, e.g. up to 1,000 atmospheres being necessary because of osmotic pressures. Liquid-liquid permeation is largely an equilibrium phenomenon unless the osmotic forces are overcome while in contrast liquid-vapor or vapor-vapor permeations are rate controlled processes even at moderate conditions, in which the vapor is removed as soon as it reaches the collection surface of the membrane. Liquid-vapor and vapor-vapor separations are accordingly much more effectively carried out than liquid-liquid separations.

The permation membrane used in the process of the present invention is an aromatic imide polymer of the formula

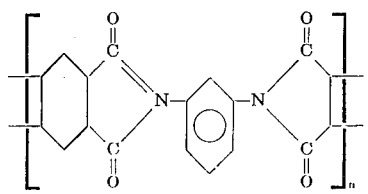

wherein $n$ represents the number of repeating units, the membrane hereinafter sometimes referred to as the "aromatic imide polymer membrane of the present invention". The membrane may be a simple disc or sheet of the membrane substance which is suitably mounted in a duct or pipe, or mounted in a plate and frame filter press. Other forms of membranes may also be employed such as hollow tubes and fibers through which or around which the feed is supplied or is recirculated with the product being removed at the other side of the tubes as a vapor. Various other shapes and sizes are readily adaptable to commercial installations. The membrane, of course, must be insoluble in the organic separation medium. "Membrane insolubility" as used herein is taken to include that the membrane material is not substantially solution-swellable or sufficiently weakened by its presence in the solution to impart "rubbery" characteristics which can cause creep and rupture under the conditions of use, including high pressures. The molecular weight of the aromatic imide polymer may vary over a wide range, but in all cases should be sufficient to permit the polymer to be formed into a film which is sufficiently strong to withstand separation processing conditions.

The membranes may be prepared by any suitable procedure such as, for example, by casting a film or spinning a hollow fiber from a "dope" containing polymer and solvent. Such preparations are well known to the art.

An important control over the separation capacity of a particular membrane is exercised by the method used to form and solidify the membrane (e.g. casting from a melt into controlled atmospheres or from solution into baths at various concentrations and temperatures).

The art of membrane usage is well known with substantial literature being available on membrane support, fluid flow and the like. The present invention is practiced with such conventional procedures and apparatus. The membrane must, of course, be sufficiently thin to permit permeation as desired, but sufficiently thick so as to not rupture under the pressure conditions employed. Typically suitable membranes have a thickness of from about ½ to about 10 mils.

The following examples illustrate specific embodiments of the present invention. In the examples the membrane employed was in the form of a film disk (1 mil thickness) and was mounted in a membrane holder. The membrane was prepared by casting from solution.

EXAMPLE 1

The separation of 1,3-butadiene from an organic liquid consisting of 80 weight percent 1,3-butadiene and 20 weight percent trans-2-butene was conducted under pervaporation separation conditions using an aromatic imide polymer membrane of the formula

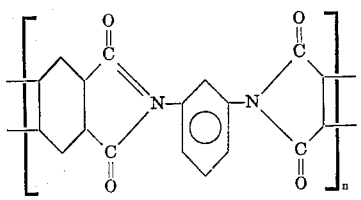

The polymer is commerically available and is sold by E. I. DuPont de Nemours Company, Wilmington, Delaware under the name KAPTON. The separation was conducted at room temperature with the pressure on the liquid side of the membrane being the vapor pressure of the liquid feed mixture and the pressure on the vapor side of the mambrane being 0.1 mm. Hg. Preferential permeation of 1,3-butadiene was effected. The separation factor was 4.9. The permeation rate was $2.0 \times 10^{-5}$ grams per hour per 11.3 cm² per mil of membrane thickness.

EXAMPLE 2

The procedure of Example 1 is followed to separate isoprene from a liquid mixture of isoprene, hexene, and pentane using an aromatic imide polymer membrane of the present inventiion.

While the invention has been described with reference to particular embodiments thereof, it will be appreciated that modifications and variations are possible without departing from the invention.

We claim:

1. A process for the separation of diene from an organic mixture comprising diene and alkene having one double bond which comprises contacting the said mixture against one side of an aromatic imide polymer membrane, the repeating unit of the said polymer being of the formula

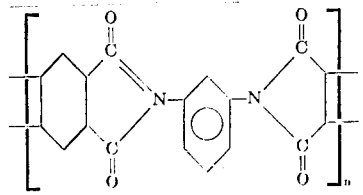

and withdrawing at the second side of the membrane a vaporous mixture having a higher concentration of diene than the aforesaid organic mixture with the mixture at the second side being maintained at a lower chemical potential than the mixture on the other side of the membrane.

2. The process of claim 1 wherein the pressure on the second side of the membrane is less than atmospheric pressure and lower than the pressure on the other side of the membrane.

3. The process of claim 1 wherein the said organic mixture is a liquid mixture.

4. The process of claim 1 wherein the said organic mixture comprises butadiene and butene.

* * * * *